United States Patent [19]

Toi et al.

[11] Patent Number: 4,815,056
[45] Date of Patent: Mar. 21, 1989

[54] AUTOMATIC DISK HANDLING DEVICE WITH OVERTURN PLATE

[75] Inventors: Hiroshi Toi; Shinichi Fujita, both of Kanagawa; Makoto Uragaki, Tokyo, all of Japan

[73] Assignee: Sony Corporation, Tokyo, Japan

[21] Appl. No.: 833,383

[22] PCT Filed: Jun. 5, 1985

[86] PCT No.: PCT/JP85/00320
§ 371 Date: Feb. 4, 1986
§ 102(e) Date: Feb. 4, 1986

[87] PCT Pub. No.: WO85/05722
PCT Pub. Date: Dec. 19, 1985

[30] Foreign Application Priority Data

Jun. 6, 1984 [JP] Japan ............................. 59-116210
Jun. 6, 1984 [JP] Japan ............................. 59-84086

[51] Int. Cl.$^4$ ..................... G11B 17/26; G11B 17/22
[52] U.S. Cl. ............................... 369/36; 369/30
[58] Field of Search ............... 369/30, 33, 32, 34, 369/36, 38, 39, 75.2, 178, 180, 191, 192, 195–197, 199, 200; 360/69, 71, 86, 97–99; 358/102

[56] References Cited

U.S. PATENT DOCUMENTS

| | | | |
|---|---|---|---|
| 2,482,659 | 9/1949 | Davis et al. | 369/36 |
| 4,271,440 | 6/1981 | Jenkins et al. | 360/69 |
| 4,504,936 | 3/1985 | Faber et al. | 369/34 |
| 4,527,262 | 7/1985 | Manto | 369/39 |
| 4,608,679 | 8/1986 | Rudy et al. | 369/36 |
| 4,614,474 | 9/1986 | Sudo | 369/178 |

FOREIGN PATENT DOCUMENTS 59-117755 7/1984 Japan ............................. 369/178
59-186168 10/1984 Japan ............................. 360/98

OTHER PUBLICATIONS

McGraw-Hill Dictionary of Scientific and Technical Terms, 1974, p. 227.

Primary Examiner—Alan Faber
Assistant Examiner—Steven R. Garland
Attorney, Agent, or Firm—Lewis H. Eslinger

[57] ABSTRACT

In a diskfile device wherein a large amount of information transmitted by documents, images, sounds, etc. are stored in a lot of disks, these disks are included in respective cartridges (1), these cartridges (1) are accommodated in a stocker, and a cartridge (1) selectively drawn from the stocker (2) is fed to a player (4) so as to insert information in and extract information from the disk in the cartridge (1), the diskfile device comprises a stationary stocker (2) for accommodating a lot of cartridges (1) in parallel with one another in respective shelves (3) of the stocker (2), a plurality of stationary players (4) (5) for inserting information in and extracting information from the disk, and a carrier (6) linearly movable between and in front of the stocker (2) and the plurality of players (4) (5), wherein a cartridge (1) selectively drawn from the stocker (2) is selectively fed to either of the players by the carrier (6) and a cartridge (1) which has been used on the other player is returned back by the carrier (6) to a shelf reserved for this cartridge (1), so that a large amount of information can selectively be extracted and inserted on high speed.

10 Claims, 9 Drawing Sheets

AUTOMATIC DISK HANDLING DEVICE WITH OVERTURN PLATE

TECHNICAL FIELD

The present invention relates to a diskfile device wherein appointed disks are rapidly fed to a player in which the insertion and extraction of information are performed, so that a large amount of information transmitted by documents, images, sounds, etc. can be not only stored in a lot of disks but also extracted from these disks at high speed.

BACKGROUND ART

As a publicly known reference, there may be cited Japanese Laid-Open Patent Application No. 59-30263 a device disclosed in which comprises a wide stocker in which a lot of thin cartridges including disks therein are accommodated side by side, being stood vertically and lined in the width direction of the stocker, a stocker conveying means which conveys the stocker horizontally in the width direction of the stocker, a draw mechanism which comprises a pair of upper and lower pawls and is arranged in front of the stocker, and a player arranged by a side of the draw mechanism.

As the stocker is horizontally moved by the stocker conveying means, the pair of pawls are relatively moved within a pair of grooves which are formed in the upper and lower sides of one end portion of each cartridge, so that an appointed cartridge is selected from among the many cartridges. The selected cartridge is then drawn forward from the stocker by the pair of pawls of the draw mechanism as soon as the stocker is stopped in an appointed position. The cartridge is thereafter fed to the player in which information is inserted in or extracted from the disk enclosed in the cartridge.

However, the above device possesses several defects as mentioned below.

(A) As the stocker is horizontally moved in order to select the appointed cartridge, a space twice as large as the width of the stocker becomes necessary for the movement of the stocker. Hence, the space is used very needlessly.

(B) The stocker in which a lot of cartridges are accommodated is very heavy, so that the stocker conveying means must be constructed on a large scale. Thus, the whole device becomes not only large and heavy but also expensive.

(C) On account of the heavy stocker, the stocker can not be rapidly moved, so that it can not be possible to select the appointed cartridge on high speed, too. Thus, it is difficult to extract information successively on high speed from the disks in the cartridges.

(D) As the stocker is moved by the stocker conveying means, so that size and weight of the stocker are restricted in view of its conveying speed and strength. The number of accommodated cartridges is, therefore, 20 to 30 at most and will not reach 50 to 100, so that the device is not suitable for dealing with a large amount of information.

(E) The stocker is horizontally moved so as to select the appointed cartridge, so that it is difficult to perform preparatory operations, such as selecting, drawing and standing-by operations on the next appointed cartridge for extracting information successively from the disk in the next appointed cartridge while information is extracted by the player from the preceding disk. Because the position of the stocker relative to the draw mechanism is changed if the stocker is moved after the disk is fed to the player, it is impossible to return the cartridge on the player to the original position in the stocker after the extraction is over.

Thus, it takes too much time to replace the preceding disk on the player with the next one, so that successive high-speed extraction of information becomes impossible.

DISCLOSURE OF INVENTION

The diskfile device of this invention comprises a stationary stocker in the respective shelves of which a lot of cartridges including respective disks therein are accommodated in parallel with one another, a plurality of stationary players by which information is inserted in and extracted from the disk in the cartridge, and a carrier moved linearly between and in front of the stocker and the plurality of players, wherein one cartridge selectively drawn from the stocker is fed by the carrier to one of the players, and the other cartridge which has been used on the other of the players is returned back by the carrier to a shelf reserved for the other cartridge in the stocker.

According to the device of this invention, a large amount of information can be selectively inserted or extracted at high speed.

Furthermore, the diskfile device of this invention comprises a stationary stocker in the respective shelves of which a lot of cartridges, each of which includes a disk, are accommodated in parallel with one another, a plurality of stationary players by which information is inserted in and extracted from the disk in the cartridge, a carrier capable of selectively drawing an appointed cartridge from the stocker and conveying it to one of the players, carrier transfer means linearly movable with the carrier in front of the stocker and the plurality of players which are arranged to be adjacent to the stocker and flush in their front sides with the stocker, a pair of pawls on the carrier, and a pawl transfer means capable of moving the pair of pawls in a direction perpendicular to the direction of the carrier travel, so that the cartridge is moved between the stocker or the plurality of players and the carrier in a direction perpendicular to the direction of the carrier's travel by the pawl tranfer means, as the pair of pawls engage with a pair of grooves disposed on the respective sides in the one end of the cartridge.

The pairs of grooves of the cartridges accommodated in the stocker and also fed to the players are in alignment with one another in a direction parallel to the direction of the carrier's travel so as to make the pair of pawls movable within the respective grooves of the cartridges when the carrier is linearly moved by the carrier transfer means, so that it can be performed on high speed to select an appointed cartridge from among the lot of cartridges in the stocker and feed it to either one of the players, or to select either one of the cartirdges on the players and return it back to its shelf in the stocker.

Thus, the above diskfile device has the following features.

(A) The stocker is stationarily located, so that it becomes unnecessary to prepare an extra space for moving the stocker.

(B) As the carrier is much smaller and lighter than the stocker, it can be moved easily on high speed by the belt drive or the like.

(C) Not only the small and light carrier is rapidly moved but also the pair of pawls of the carrier engaging with the grooves of the cartridges are rapidly moved at the time when an appointed cartridge is selected from among the cartridges in the stocker or in the players, so that movement of the carrier is not obstructed by either of the cartridges or the pair of pawls during selection of the appointed cartridge. The selection of the cartridge can be always conducted on high speed.

Furthermore, when the carrier is stopped after the selection of the cartridge, the pair of pawls is engaging with the pair of the grooves of the selected cartridge, so that the cartridge is immediately drawn from the stocker or the players into the carrier. Therefore, a large amount of information is inserted in or extracted from the disks at high speed.

(D) The small and light carrier is rapidly moved but the stocker is stably fixed in the predetermined position. So the stocker can be made so large as to accommodate, for example, 50 to 100 cartridges. Hence, the device of this invention is highly suited for the insertion and extraction of the large amount of information.

(E) The preparatory actions for the successive extraction of information, such as the selection of the next cartridge, its conveyance and a wait for inserting it in one of the players can be performed at high speed, while information is inserted in or extracted from the disk in the preceding cartridge in the other of the players, so that informtion in many disks is successively extracted at high speed without waiting.

The diskfile device of this invention comprises a stationary stocker in the respective shelves of which many cartridges, each of which includes a disk, are accommodated in parallel with one another, stationary players for inserting information in and extracting information from the disk in the cartridge, a carrier for conveying the cartridge which is selectively drawn from the stocker and feeding it to the players, an overturn plate secured to the carrier in its U-shaped frame, a pair of shafts disposed on one side of the overturn plate and a cartridge holder disposed on the other side of the overturn plate.

The pair of shafts are so arranged in the middle in width of the overturn plate and on the axis parallel to the direction of the cartridge's travel as to be spaced apart from each other in the direction of the cartridge's travel. The overturn plate is mounted rotatably at an angle of 180° on the frame through the pair of shafts. Arranged between the pair of shafts is a motor, the axis of which is in alignment with the axis of the pair of shafts and by which one of the shafts is rotated. While the cartridge drawn from the stocker and held in the carrier holder, is conveyed to the player by the carrier, it is turned at the angle of 180° by the overturn plate which is driven by the motor.

According to the diskfile device constituted as described above, the disk in the cartridge drawn from the stocker can be freely turned from A-face to B-face, or from B-face to A-face before the cartridge is fed to the player.

The motor for rotating the overturn plate at the angle of 180°, is placed between the pair of shafts so as not to protrude from the area of the overturn plate, so that it becomes possible to make the overturn mechanism small to the utmost and the carrier with the overturn mechanism becomes not so large. In addition, the overturn plate, which is apt to be supported at only one end thereof as the cartridge is drawn into or from the other end thereof, is supported at both ends under the constitution in which the pair of shafts are provided at one side of the overturn plate and the cartridge holder is provided at the other side thereof, the pair of shafts being arranged to be separated apart from each other in the direction of the cartridge's travel. Accordingly, the overturn plate is firmly supported and does not rattle during the movement of the cartridge by the carrier.

In this invention, the diskfile device comprises a stationary stocker in many shelves of which a lot of cartridges, each of which includes a disk, are accommodated in parallel with one another, stationary players by which information is inserted in or extracted from the disk in the cartridge, a carrier by which the cartridge selectively drawn from the stocker is fed to the player, an overturn plate disposed in an almost U-shaped frame of the carrier, a pair of shafts provided at one side of the overturn plate, and a cartridge holder provided at the other side of the overturn plate.

The pair of shafts are so arranged in the middle in width of the overturn plate and on the axis parallel to the direction of the cartridge's travel as to be spaced part from each other, whereby the overturn plate is rotated at an angle of 180°. A motor which drives one of the shafts is arranged between the pair of shafts in alignment with the axis of the shafts. The cartridge drawn from the stocker and then held in the cartridge holder is rotated at the angle of 180° by the motor so as to turn the cartridge from A-face to B-face, or from B-face to A-face, while the cartridge is conveyed to the player by the carrier.

Provided on the frame are two first sensors for detecting the overturn plate rotated at the angle of 180° and brought to its upper and lower positions, and two second sensors which are arranged in the positions corresponding with the respective positions where the cartridge holder is placed due to the rotation of the overturn plate at the angle of 180°. The two second sensors can detect a lot of detected portions provided in the positions of the shelves of the stocker and in the cartridge inserting positions of the players.

When the overturn plate is turned at the angle of 180° to one position during the conveyance of the cartridge by the carrier, the overturn plate in that position is detected by one of the first sensors, and one of the second sensors arranged in the position corresponding with one position of the cartridge holder, which is turned together with the overturn plate, is switched over to operating state, so that the carrier is stopped in a position opposite to the cartridge inserting position of the player or in a position opposite to the predetermined shelf, owing to the detecting action of the one of the second sensors.

According to the diskfile device of this invention, the cartridge drawn from the stocker can be freely turned and then fed to the player. The motor for rotating the overturn plate at the angle of 180° is placed between the pair of shafts so as not to protrude from the area of the overturn plate, so that it becomes possible to make the overturn mechanism small to the utmost and the carrier with the overturn mechanism becomes not so large.

In addition, the overturn plate, which is apt to be supported at only one end thereof as the cartridge is drawn into or from the other end thereof, is supported at both ends under the constitution that the pair of shafts are provided at one side of the overturn plate and the cartridge holder is provided at the other side thereof, and the pair of shafts are arranged to be separated apart from each other in the direction of the cartridge travel. Accordingly, the overturn plate is firmly supported and does not rattle during the movement of the cartridge by the carrier.

Furthermore, the cartridge holder is placed at either side of the pair of shafts due to rotation of the overturn plate at the angle of 180° and thereby, changes its position in relation to the cartridge inserting position of the player and the shelf of the stocker in which a cartridge in the cartridge holder is to be accommodated. However the new position of of the overturn plate after rotation at the angle of 180° is detected by one of the two first sensors, and one of the second sensors arranged in the position corresponding with a position of the cartridge holder, which is turned together with the overturn plate, is switched over to the operating state.

The one of the second sensors detects the detected portion disposed in the cartridge inserting position of the player or in the position of the shelf of the stocker reserved for the cartridge, so that the carrier is stopped. Therefore, the cartridge holder which is placed at either side of the pair of shafts due to rotation of the overturn plate at the angle of 180°, is always accurately positioned in relation to the cartridge inserting position of the player and the position of the specific shelf of the stocker, whereby the cartridge is turned over while it's conveyed, can be always accurately transferred between the cartridge and the player or the specific shelf of the stocker.

Furthermore, the two second sensors are so placed apart from the axis of the pair of shafts as to correspond with the biased amount of the cartridge holder, so that the carrier is always accurately stopped whenever one of the second sensors detects the specific detected portion. Therefore, it becomes unnecessary to perform such a troublesome and complicated control that the transferred distance of the carrier is so adjusted as to correspond with the biased amount of the cartridge holder. The control of the carrier's travel can be conducted very easily.

BRIEF DESCRIPTION OF DRAWINGS

The drawings show an embodiment of a diskfile device to which this invention is oriented.

BEST MODE FOR CARRYING OUT THE INVENTION

Figure 1:
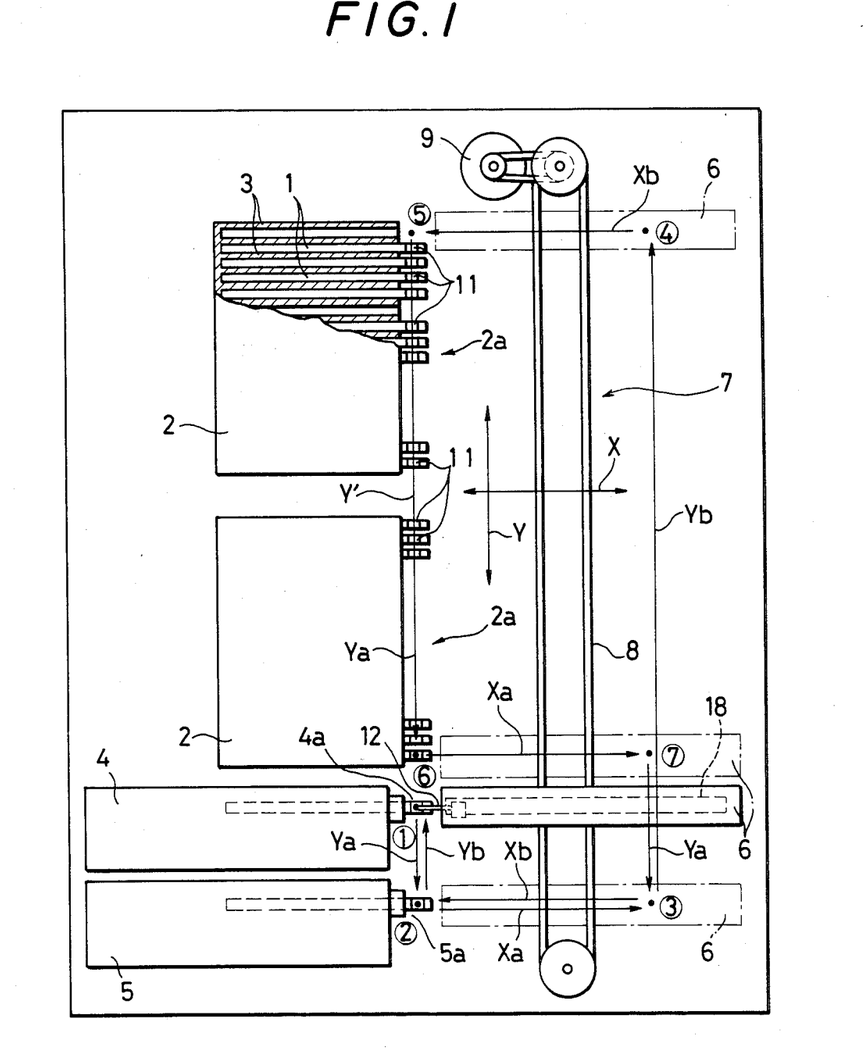
FIG. 1 is a whole side view in outline of the diskfile device.
Figure 2:
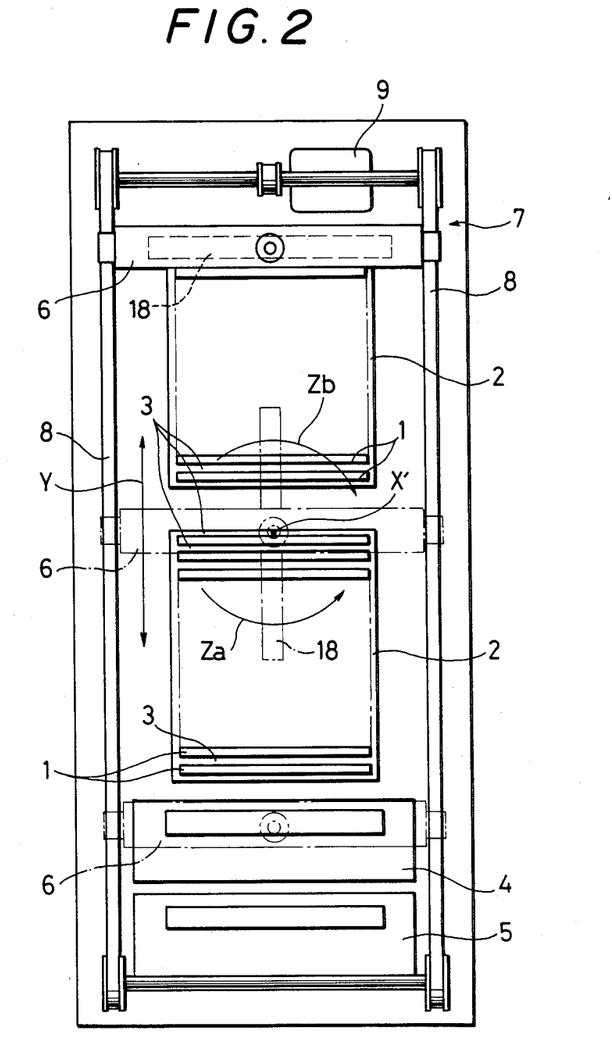
FIG. 2 is a front view of the diskfile device.

On referring to the drawings, an embodiment of the diskfile device to which this invention is oriented will be described hereinafter. As illustrated in FIGS. 1 and 2, accommodated in a cartrige 1 is a recording disk (not shown). The cartridge is thin in thickness and almost square-shaped. The stocker is much larger in height and vertically located. A lot of horizontal shelves 3 are disposed in the stocker in parallel with one another, so that 50 to 100 cartridges can be horizontally accommodated in the stocker 2 in parallel with one another.

Two players 4 and 5 adjacent to each other are arranged near the bottom of the stocker 2 (or near the top of the stocker 2) for inserting information in or extracting information from the disk in the cartridge. The front sides $2a$, $4a$ and $5a$ of the stocker 2 and the two players 4 and 5 are flush with one another.

A cartridge is selectively drawn from the stocker by the carrier 6 and conveyed to a selected one of the two players the carrier 6 is vertically and linearly moved in direction of arrow Y along the front sides $2a$, $4a$ and $5a$ of the stocker 2 and the two players 4 and 5.

The carrier transfer means 7 which drives the carrier 6 comprises, for example, a pair of right and left vertical timing belts 8. When the two timing belts 8 are driven by a motor 9, the carrier 6 is guided in a horizontal state by a pair of right and left vertical rails (not shown) to be moved on high speed in the direction of arrow Y.

Figure 3:
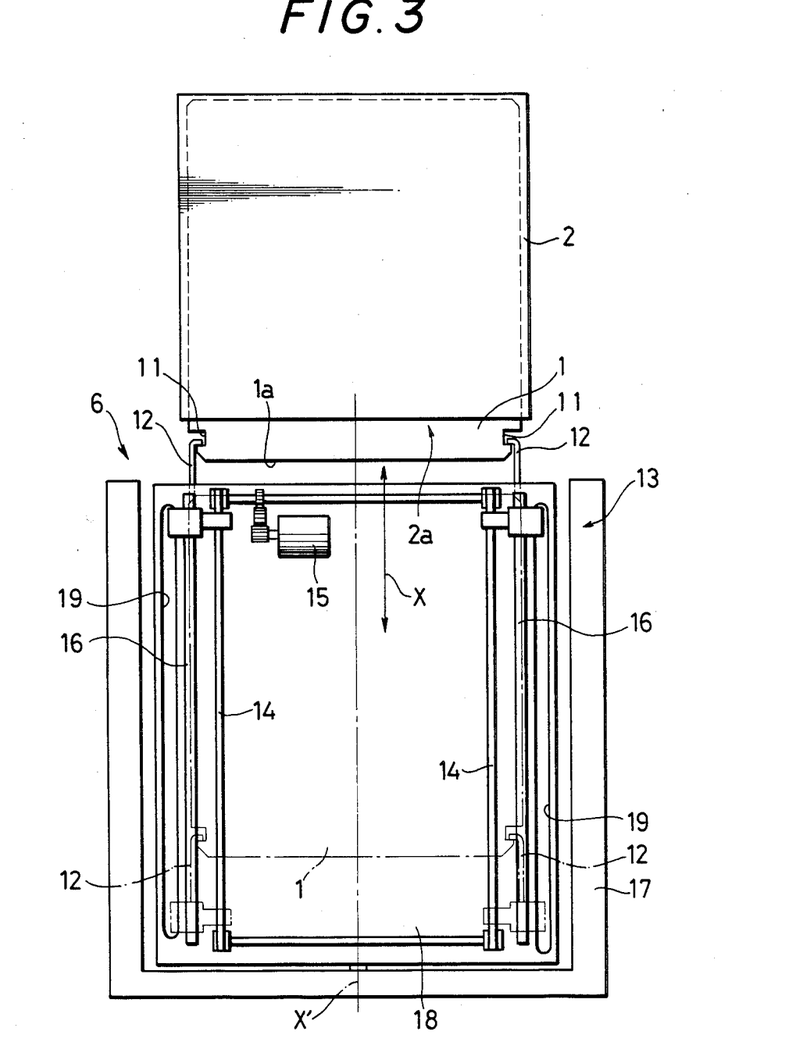
FIG. 3 is an enlarged plan view of the important part of the diskfile device.
Figure 4:
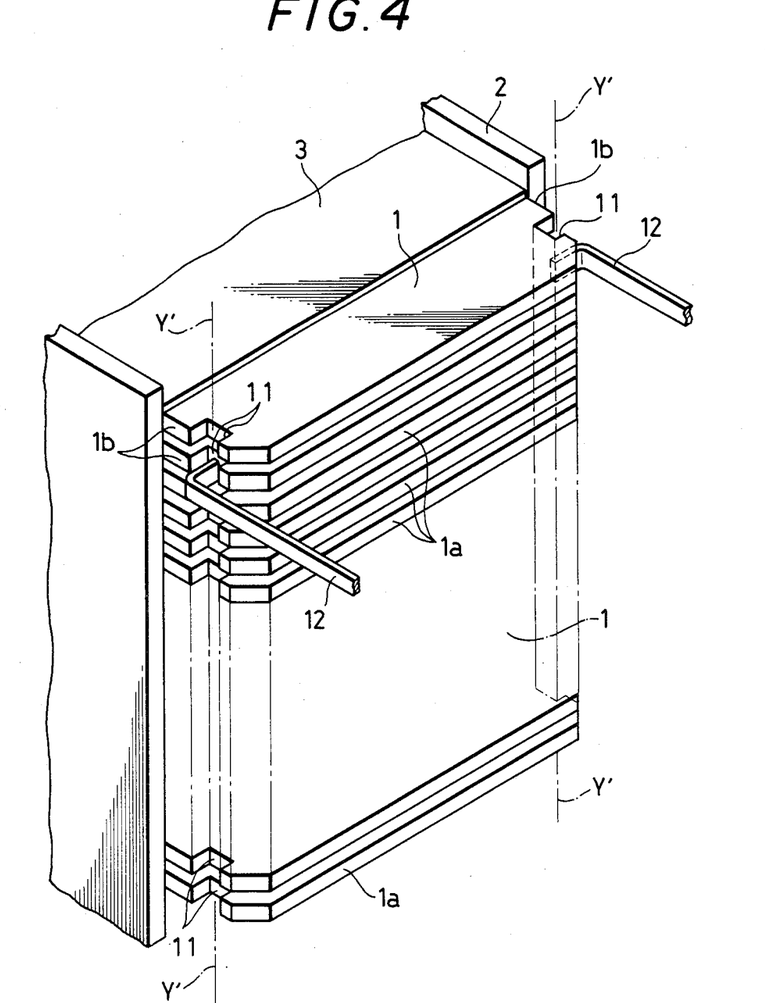
FIG. 4 is an enlarged perpsective view of the important part of the diskfile device.

Next, as illustrated in FIGS. 3 and 4, a pair of right and left grooves 11 are provided on the respective right and left sides $1b$ of the one end $1a$ of the cartridge 1, and a pair of right and left pawls 12 engageable with the respective grooves of a selected one of the cartridges are mounted on the carrier 6. The pawl 12 is almost L-shaped and the right and left pawls 12 are symmetrical with respect to the central axis.

Disposed on the carrier 6 is a pawl transfer means 13 which horizontally moves the pawls 12 in direction of arrow X, that is, in a direction perpendicular to the direction of the carrier travel which is shown by arrow Y. The pawl transfer means 13 comprises, for example, a pair of right and left timing belts 14.

When the timing belts 14 are driven by a motor 15, the pair of pawls 12 are guided by a pair of right and left horizontal rails 16 to be horizontally moved in the direction of arrow X between an advanced position indicated in solid lines and a retreated position indicated in chain-dotted lins in FIG. 3.

The pawl transfer means 13 is disposed on one of the upper and lower sides of a overturn plate 18, which is horizontally arranged within an almost U-shaped frame 17 of the carrier 6 and turns in direction of arrow $Z_a$ or $Z_b$ in FIG. 2 at an angle of 180° on a central axis X' parallal to the direction of arrow X.

Provided on the other side of the swing plate 18 is a cartridge holder which will be described later, and the pawls 12 are horizontally moved within the cartridge holder 23 in the direction of arrow X by pawl drive members mentioned later, which are guided by a pair of right and left slits 19 in the swing plate 18, respectively.

As shown in FIGS. 1 and 4, the pairs of grooves 11 of the cartridges accommodated in the stocker 2 and put on the players 4 and 5 are on vertical line Y' which is parallel to the direction of arrow Y, that is, the direction of the carrier travel. When the carrier 6 is linearly and vertically moved in the direction of arrow Y under the state that the pawls 12 have been brought to the advanced position indicated in solid lines in FIG. 3, the pawls 12 are moved in the direction of arrow Y in the grooves 11 of the cartridges without touching the cartridges 1. The cartridges 1 and pawls 12 never interfere with the vertical movement of the carrier 6.

Next, a number of motions concerning a high speed extraction of information by the diskfile device constituted as mentioned above will be described on referring to FIG. 1.

In position ① of the pawls 12 of the carrier 6, the second cartridge 1 is fed to the upper player 4, and in the lower player 5, there is the first cartridge from the disk of which information has been already extracted. After the second cartridge 1 is fed to the upper player 4, the carrier 6 is vertically moved in the direction of arrow $Y_a$, so that the pawls 12 move from position ① to position ② and engage the respective grooves 11 of the first cartridge 1 on the lower player 5.

While the pawls 12 move from position ① to position ② the second cartridge 1 fed to the upper player 4 is drawn into the upper player 4 and information is extracted from the disk in the second cartridge 1, and during the extraction of information, the first cartridge on the lower player 5 is returned back to its shelf 3 in the stocker 2, and then, a number of preparatory motions for the extraction of information from the third cartridge 1, such as selection, drawing-out, conveyance and waiting for supply to the lower player 5 are conducted at high speed.

That is, as the pawls 12 of the carrier 6 engaged with the first cartridge on the lower player 5 is horizontally moved in the direction of arrow $X_a$ from position ② to position ③ in order to have the first cartridge 1 received in the carrier 6, in other words, in a cartridge holder provided in the swing plate 18. Then, the carrier 6 is vertically moved in the direction of arrow $Y_b$ and stopped in the position where the first cartridge can be returned back to its shelf 3, and the pawls 12 are horizontally moved in the direction of arrow $X_b$ from position ④ to position ⑤, so that the first cartridge 1 is accommodated in its shelf 3 of the stocker 2.

The carrier 6 is then vertically moved in the direction of arrow $Y_a$ in order to select the third cartridge. At this time, the pawls 12 move vertically within the grooves 11 of the cartridges 1. After the carrier 6 stops near the third cartridge 1, the pawls 12 are horizontally moved from position ⑥ to position ⑦ and engage with the third cartridge 1, so that the third cartridge 1 can be drawn from its shelf 3 in the stocker 2 into the carrier 6.

As soon as the carrier 6 is vertically moved in the direction of arrow $Y_a$, and stopped near the lower player 5, the pawls 12 is horizontally moved from position ③ to position ② in the direction of arrow $X_b$, and third cartridge 1 is fed to the lower player 5.

When a chain of preparatory actions are taken at high speed and the second cartridge is ejected from the upper player 4 after the extraction is over, the carrier 6 is vertically moved in the direction of arrow $Y_b$ to move the pawls 12 from position ② to position ① and the pawls 12 are engaged with the respective grooves 11 of the second cartridge 1 in the upper player 4.

While the pawls 12 are moved from position ② to position ①, the third cartridge 1 fed to the lower player 5 is drawn into the lower player 5 and information is extracted from the disk in the third cartridge 1, and next preparatory actions as mentioned above are taken at high speed by means of the carrier 4 which is near the upper player 4.

In the meantime, double-faced disks can be used in the above diskfile device, and therefore, the swing plate 18 in the carrier 6 is turned at an angle of 180° in the direction of arrow $Z_a$ or $Z_b$ in FIG. 2 on the central axis X′ so as to select A-face on B-face of the disk in the cartridge 1 while the carrier 6 is vertically moved in the direction of arrow $Y_a$ in order that the cartridge 1 drawn from its shelf 3 in the stocker 2 is fed to the player 4 or 5, or while the carrier 6 is vertically moved in the direction of arrow $Y_b$ so as to return the cartridge 1 back to its shelf 3 in the stocker 2 from the player 4 or 5.

In case of the above diskfile device, information can also be inserted at high speed by the players 4 and 5. The cartridges 1 accommodated in the stocket 2 are successively drawn out and information is inserted in turn in the disks in the cartridges 1 in the same way that information is extracted as mentioned above.

At the time when information is inserted in or extracted from the disk in the cartridge 1 by the player 4 or 5, the following two methods are to be utilized: one is to drive the disk in a state of holding it in the cartridge 1, and the other is to separate the upper half and the lower half of the cartridge 1 in the vertical direction to drive the disk. In case of the latter, it becomes possible to sandwich the disk between the upper half and lower half to make the cartridge 1 much thinner after information is inserted in or extracted from the disk, so that a greater number of cartridges 1 is accommodated in the stocker 2.

Next, the overturn mechanism of the overturn plate 18 disposed on the carrier 6 will be described hereinafter on referring to FIGS. 5 to 9B.

A pair of shafts 21 and 22 are disposed on one side 18a of the overturn plate 18 and the cartridge holder 23 is disposed on the other side (18b) of the overturn plate 18. On the side 18a of the overturn plate 18, there is also disposed the above-mentioned pawl transfer means 13. The pair of shafts 21 and 22 are horizontally arranged over the central portion of the overturn plate 18 along its width direction, that is, along the right to left direction in FIG. 5, and spaced apart distance 1 from each other in the direction of central line X′, which is parallel to the direction of arrow X to which the cartridge is moved.

Figure 7A:
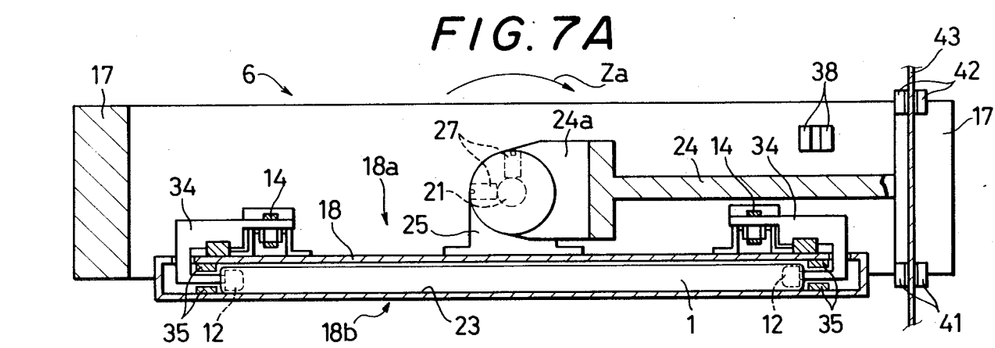
FIGS. 7A and 7B are sectional views taken along the line VII—VII on FIG. 5 for explaining the overturn operation of the cartridge.
Figure 7B:
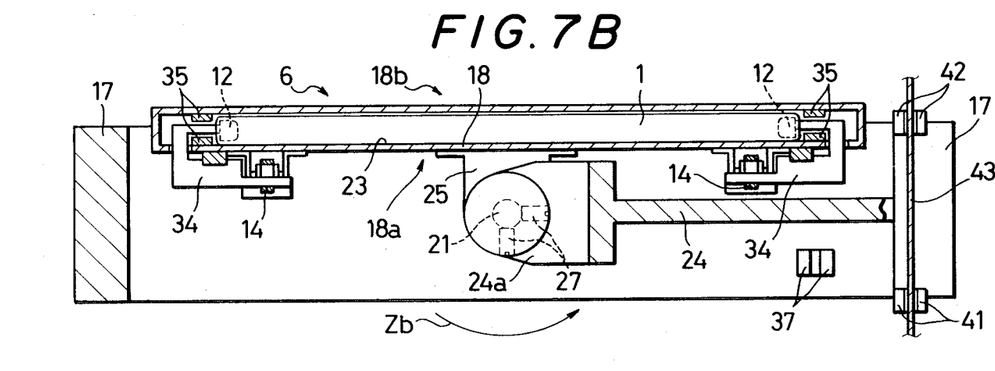

As shown in FIGS. 7A and 7B, the shafts 21 and 22 are rotatably supported respectively by a plurality of brackets 24a and 24b which are disposed on a support plate 24 horizontally fixed to the central portion of a frame 17 along its vertical thickness direction, and a pair of brackets 25 and 26 fixed on one side 18a of the overturn plate 18 are rotatably fitted to the shafts 21 and 22. One of the shafts 21 is fixed to one of the brackets 25 and rotated integrally with the overturn plate 18.

A motor 28 is horizontally arranged between the pair of shafts 21 and 22 in alignment therewith, and fixed to one of the brackets 24a of the support plate 24. The motor shaft 29 of the motor 28 is connected to one of the shafts 21 through a coupling 30 and a rotation angle detector 31 of the motor shaft 29 is included in the motor 28.

Figure 6:
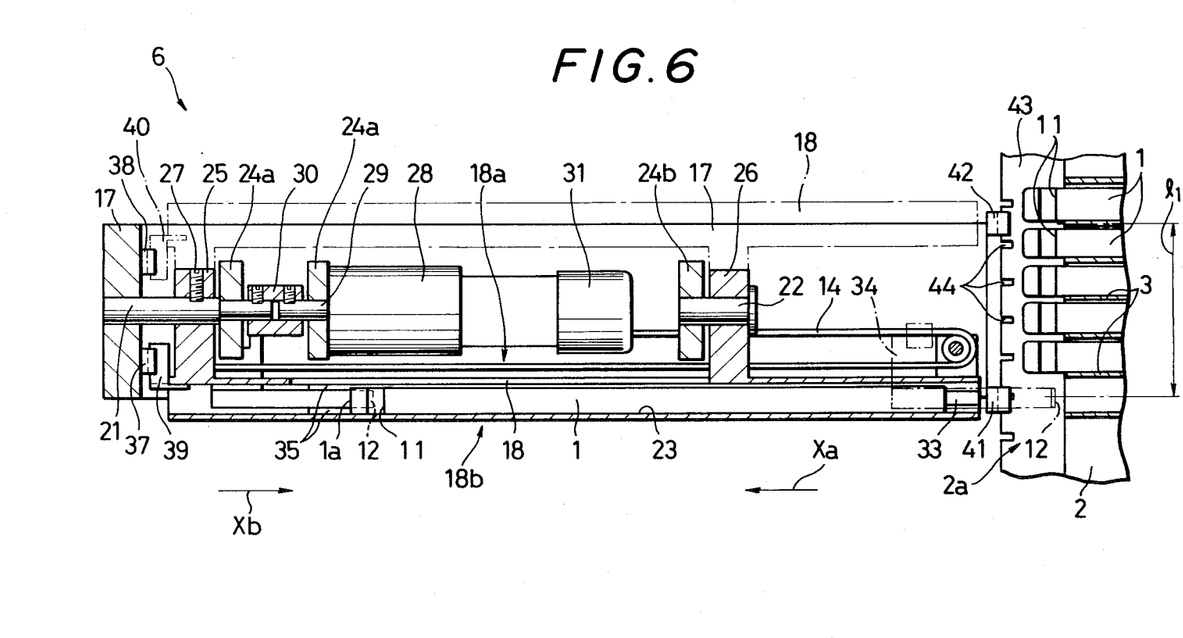
FIG. 6 is a sectional view taken along the line VI—VI on Figure.

Next, the cartridge holder 23 is so formed like a flat case as to be balanced with the thickness and width of the cartridge 1. As shown in FIG. 6, the cartridge 1 is horizontally drawn into or from the cartridge holder 23 through its opening 33 which is disposed on one end of the cartridge holder 23 opposite to the front side 2a of the stocker 2, and the pair of pawls 12 are respectively moved along the right and left insides of the cartridge holder 23 by a pair of right and left pawl drive members 34 which are driven by the pair of right and left timing belts 14.

Figure 8:
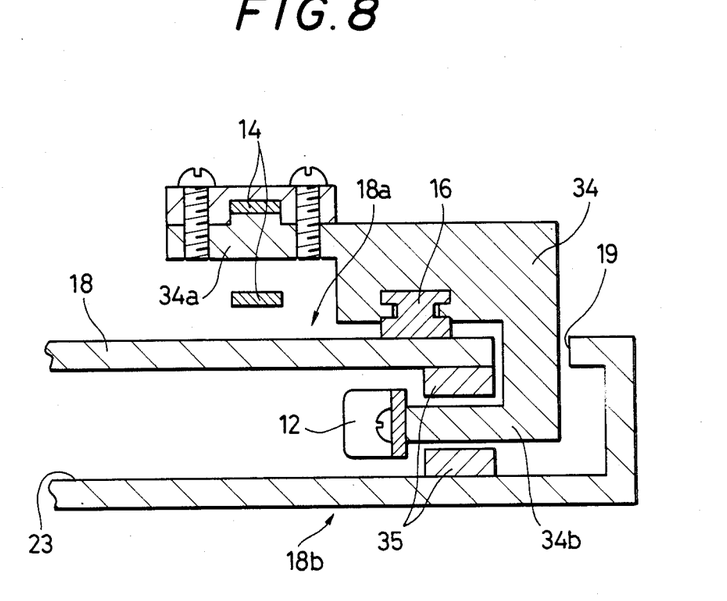
FIG. 8 is an enlarged sectional view taken along the line VIII—VIII on FIG. 5.

That is, the pawl drive members 34 are slidingly guided by the pair of right and left rails 16 fixed on the one side 18a of the overturn plate 18 as shown in FIG.

8, and are connected with the respective timing belts 14 at one ends 34a and with the respective pawls 12 at the other ends 34b, which is inserted in the cartridge holder 23 through the slit 19 provided in the swing plate 18. A pair of upper and lower guide rails 35 for guiding the cartridge 1 which is drawn into or from the cartridge holder 23, are disposed on the right and left insides of the cartridge holder 23 and that above and below the other end 34b of the pawl drive member 34.

Next, it will be described hereinafter how the cartridge 1 conveyed by the carrier 6 is turned over from A-face to B-face or the reverse.

Figure 5:
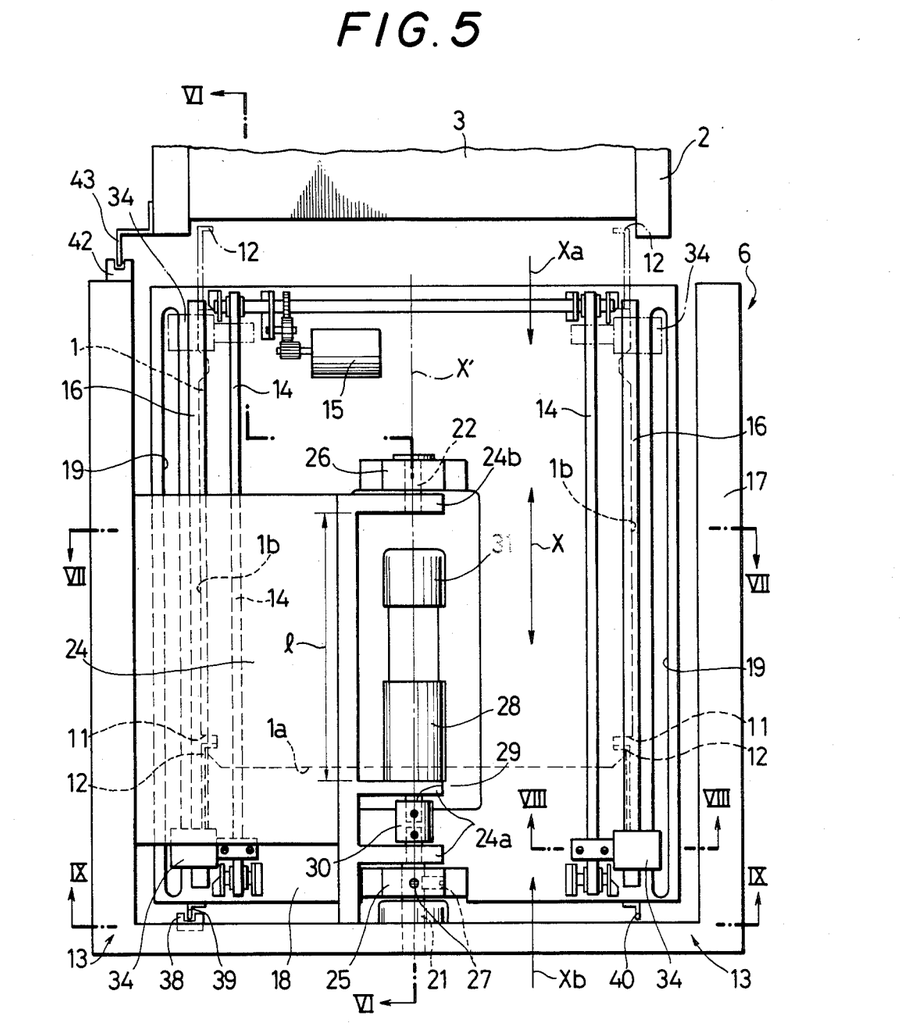
FIG. 5 is an enlarged plan view of an overturn mechanism disposed in the carrier.

When the timing belts 14 are driven by the motor 15 in the direction of arrow $X_a$ in FIGS. 5 and 6 in order to move the pawls 12 in the same direction from the advanced position indicated in chain-dotted lines to the retreated position indicated in solid lines as shown in FIGS. 5 and 6, the cartridge 1 is horizontally drawn from the stocker 2 or the player 4, 5 into the cartridge holder 23 of the carrier 6 by the pawls. On the contrary, when the timing belts 14 are driven by the motor 15 in the direction of arrow $X_b$ in FIGS. 5 and 6 in order to move the pawls 12 in the same direction from the retracted position indicated in solid lines to the advanced position indicated in chain-dotted lines as shown in FIGS. 5 and 6, the cartridge 1 in the cartridge holder 23 of the carrier 6 is horizontally drawn into the socker 2 or the player 4 or 5 by the pawls 12.

Figure 9A:
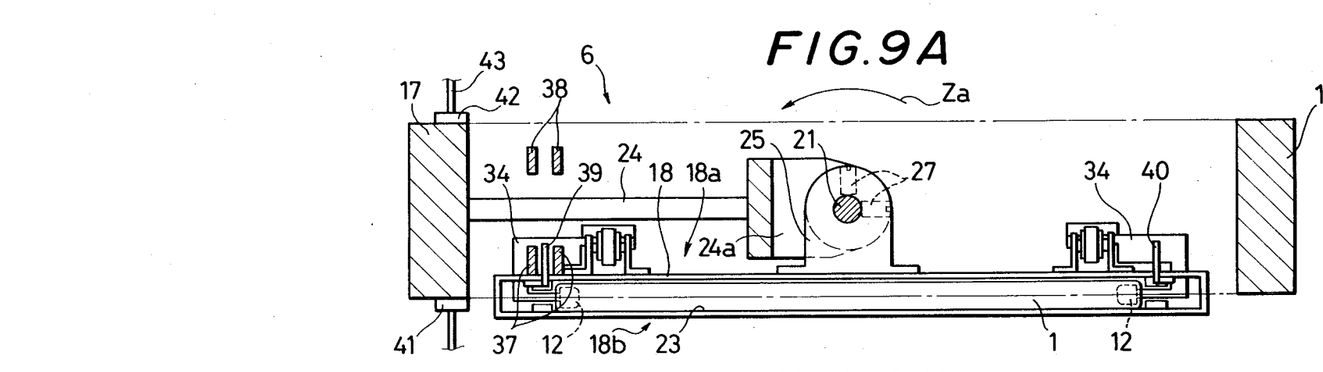
FIGS. 9A and 9B are sectional views taken along the line IX—IX on FIG. 5 for explaining the action of detecting the position of the overturn plate after overturning.
Figure 9B:
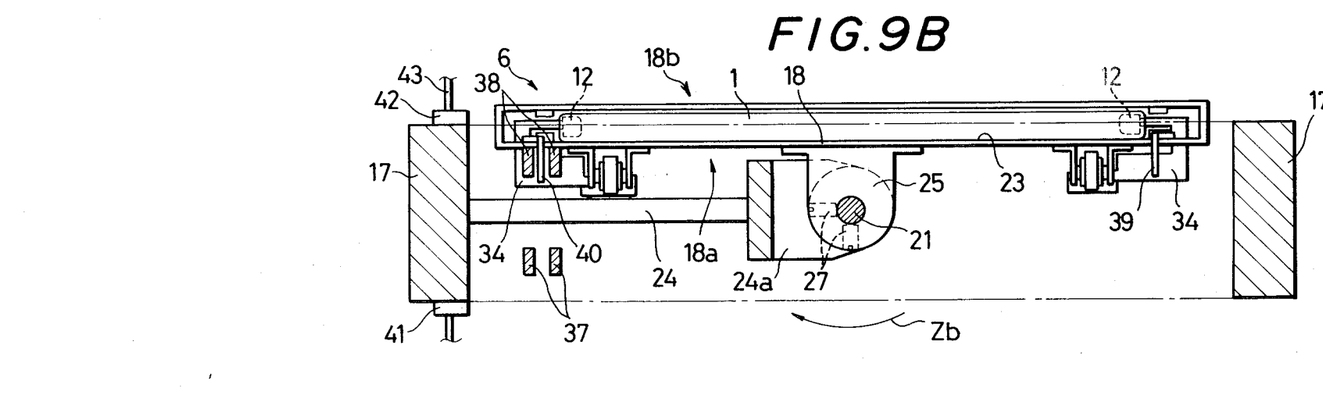

Under the state that the cartridge 1 is horizontally held within the cartridge holder 23 of the carrier 6 as shown in FIGS. 7A and 9A, if one of the shafts 21 is rotated at an angle of 180° in the direction of arrow $Z_a$ by the motor 28, the overturn plate 18 is turned on the shafts 21 and 22 at an angle of 180° in the direction of arrow $Z_a$, so that the horizontal A-or B-face of the disk in the cartridge 1 held in the cartridge holder 23 is changed from the states shown in FIGS. 7A and 9A to the states shown in FIGS. 7B and 9B. And on the contrary, if the shafts 21 is rotated at an angle of 180° in the direction of arrow $Z_b$ by the motor 28 under the states shown in FIGS. 7B and 9B, the overturn plate 18 is turned at an angle of 180° in the direction of arrow $Z_b$ on the shafts 21 and 22, so that the horizontal A- or B-face of the disk is changed from the state shown in FIGS. 7B and 9B to the state shown in FIGS. 7A and 9A.

At this time, the positions of the overturn plate 18 shown in FIGS. 7A and 9A or FIGS. 7B and 9B are accurately detected by the rotation angle detector 31 included in the motor 28, and due to the detection, the overturn plate 18 is horizontally held as it is in the positions shown in FIGS. 7A and 9B or FIGS. 7B and 9B by means of a servomechanism.

As shown in FIG. 1, the above action of the cartridge 1 is efficiently performed while the carrier 6 is vertically moved in the direction of arrow $Y_a$ to convey the cartridge 1 from the stocker 2 to the player 4 or 5, or while the carrier 6 is vertically moved in the direction of arrow $Y_b$ to convey the cartridge from the player 4 or 5 to the stocker 2. Thus, the A- or B-face of the disk in the cartridge 1 drawn from the stocker 2 can be freely turned over before the cartridge 1 is fed to the player 4 or 5, so that information can be inserted in or extracted from either of the A- and B-faces of the disk in the player 4, 5.

Next, the movement controlling mechanism of the carrier 6 actuated due to the overturning action of the overturn plate 18 will be described according to FIGS. 5 to 9B.

In order to detect the upper position of the overturn plate 18 shown in FIG. 7B or 9B and the lower position thereof shown in FIG. 7A or 9A, two first sensors 37 and 38 are secured to the rear side of the frame 17. Used as the two first sensors are optical sensors each of which comprises a light emission element and a light reception element (not shown). A pair of right and left shutters 39 and 40 secured to the overturn plate 18 are alternately inserted between the light emission element and the light reception element of the first sensors 37 and 38 so that the detection output may be alternately delivered by the first sensors 37 and 38.

The cartridge holder 23 on the other side of the overturn plate 18 is brought under or over the axis of the shafts 21 and 22 as shown in FIGS. 7A or 7B, due to turning of the overturn plate 18 at an angle of 180°. Secured as shown in FIGS. 5 and 6 to one of the front sides of the frame 17 are a pair of upper and lower second sensors 42 and 41, which are so arranged as to correspond with the lower position and the upper position of the cartridge holder 23. That is, as shown in FIG. 6, the pair of lower and upper second sensors 41 and 42 are secured with space $l_1$ which corresponds with the space between the lower position and the upper position of the cartridge holder 23. The second sensors 41 and 42 also comprise a light emission element and a light reception element (not shown) as same as the first sensors 37 and 38.

As shown in FIGS. 5 and 6, a vertical plate 43 is secured to both one of the front sides 24 of the stocker 2 and one of the front sides 4a and 5a of the players 4 and 5. The vertical plate 43 is inserted between the light emission elements and the light reception elements of the second sensors 41 and 42. Provided in the vertical plate 43 are a lot of detected portions 44 comprising indentations, each of which is so formed as to correspond with both the respective shelves 3 of the stocker 2 and the respective cartridge inserting portions of the players 4 and 5. the number of the detected portions 44 is counted by the second sensors 41 and 42 as the carrier 6 vertically moves to detect the appointed detected portion 44, in the position of which the motor 9 of the carrier transfer means 7 is stopped.

The frist sensors 37 and 38 detect which of the positions, the upper position or the lower position, the overturn plate 18 is located, and the change-over in the second sensors 41 and 42 occurs due to a signal produced by the first sensor 37, 38. Then, the selected one of the second sensors 41 and 42 is brought into operation.

Next, it will be described hereinafter how to control the movement of the carrier 6 while the overturn plate 18 is overturned.

As shown in FIG. 1, the cartridge 1 is overturned due to turning of the overturn plate 18 at the angle of 180° while the carrier 6 is vertically moved in the direction of arrow $Y_a$ to convey the cartridge 1 from the stocker 2 to the player 4 or 5, or while the carrier 6 is vertically moved in the direction of arrow $Y_b$ to return the cartridge 1 back to the stocker 2 from the player 4 or 5. Thus, if the cartridge 1 held in the cartridge holder 23 is, for example, so turned at the angle of 180° as to be changed from the state shown in FIG. 9B to the state shown in FIG. 9A during the vertical movement of the carrier 6 in the direction of arrow $Y_a$ or $Y_b$ and is located under the axis of the shafts 21 and 22, the shutter 39 is inserted between the light emission element and the light reception element of the first sensor 37 as shown in FIG. 9A and the detection output is delivered by the sensor 37, so that the lower second sensor 41 shown in FIG. 6 is brought into operation.

When the carrier 6 vertically moved in the direction of arrow $Y_a$ or $Y_b$ reaches the cartridge inserting position to either of the player 4, 5 shown in FIG. 1, or to the appointed shelf 3 of the stocker 2 as the detected portion 44 near the player 4, 5 or the appointed shelf 3 is detected by the second sensor 41 due to counting in turn the detected portions 44 as mentioned above, the motor 9 of the carrier transfer means 7 is stopped to locate the carrier 6 thereat. On the occasion, the second sensor 41 is arranged in a position corresponding with the cartridge holder 23 overturned to its lower position, so that the cartridge holder 23 is accurately positioned in the cartridge inserting position of either of the players 4, 5 or the appointed shelf 3.

When the cartridge holder 23 is turned at the angle of 180° so as to be changed in its position from the state shown in FIG. 9A to the state shown in FIG. 9B during the vertical movement of the carrier 6 in the direction of arrow $Y_a$ or $Y_b$ and the cartridge 1 in the cartridge holder 23 is brought over the axis of the shafts 21 and 22, the other shutter 40 is inserted between the light emission element and the light reception element of the other first sensor 38 as shown in FIG. 9B, so that the upper second sensor 42 shown in FIG. 6 comes into operation due to the detection output from the other first sensor 38.

When the carrier 6 vertically moved in the direction of arrow $Y_a$ or $Y_b$ reaches the cartridge inserting position of either of the player 4, 5 or the appointed shelf 3 of the stocker 2 shown in FIG. 1, as the detected portion 44 near the player 4, 5 or the appointed shelf 3 is detected by the second sensor 42 due to counting in turn the detected portions 44 as mentioned above, the motor 9 of the carrier transfer means 7 is stopped to locate the carrier 6 thereat. On the occasion, the second sensor 42 is arranged in a position corresponding with the cartridge holder 23 overturned to its upper position, so that the cartridge holder 23 is accurately positioned in the cartridge inserting position of either of the player 4, 5 or the appointed shelf 3. Thus, it can be accurately performed to deliver the cartridge 1 to the player 4, 5 or the shelf 3 of the stocker 2, or to receive the cartridge 1 from the player 4, 5 or the shelf 3 after the carrier 6 has been stopped.

Having described an embodiment of this invention, it is to be understood that various changes and modifications may be effected therein without departing from the scope or spirit of this invention. For example, the carrier and pawls are not limited to the constructions shown in the embodiment but can be various in kind. The carrier transfer means and pawl transfer means are also not limited to the constructions shown in the embodiment but can be various in kind.

In the embodiment, the cartridges are horizontally accommodated in parallel with one another in the vertical direction of the stocker that has a good height, but there is no objection if the cartridges are vertically accommodated in parallel with one another in the horizontal direction of the stocker that has a wide frontage and the carrier is horizontally moved along the front side of the stocker. And in the embodiment, the plurality of players are arranged below the stocker, but there is also no objection if the plurality of players are arranged above the stocker, or separately above and below the stocker. In addition, the mechanism to draw the cartridge into or form the cartridge holder in the carrier does not necessarily comprise the pair of pawls and the pawl transfer means as shown in the embodiment, but can be various in kind.

In the embodiment, the overturn plate is driven by the motor both in the directions of arrow $Z_a$ in FIG. 7A and arrow $Z_b$ in FIG. 9B, but there is no objection if the overturn plate is driven by the motor in only one direction, for example, in the direction of arrow $Z_a$, and in the direction of arrow $Z_b$, a spring force is utilized to enable it to be returned back.

In the embodiment, the optical sensors are used for the first sensor and the second sensor, but there is no objection if the sensors of various sorts, such as mechanical sensors, magnetc sensors and photoelectric sensors are used. In addition, these sensors can be contact type sensors or noncontact type sensors.

This invention is suited for diskfile devices of various sorts, whereby information transmitted by documents, images, sounds or mixed ones of the above means can be stored in disks, and suited for devices for only reproducing (or extracting), or for recording and reproducing devices which are capable of both reproducing (extracting) and recording (inserting).

What is claimed is:

1. A diskfile device comprising:
   a stationary stocker (2) for accommodating a plurality of cartridges (1) in parallel with one another in respective shelves (3) of said stationary stocker, each of said cartridges (1) including a disk and each having an A-face and a B-face;
   a player (4) for inserting information in and extracting information from a disk in a respective cartridge (1);
   a carrier (6) for conveying said cartridge (1) selectively drawn from said stocker (3) and including means for feeding said cartridge (1) to said player (4) and receiving said cartridge from said player, said carrier (6) including an overturn plate (18) by which said cartridge (1) is rotatably moved through an angle of 180° and which is driven by a motor (28); and
   means for simultaneously operating said overturn plate while said carrier is conveying said cartridge to and from said stocker,
   wherein said overturn plate (18) holding a cartridge (1) drawn from said stocker (2) is rotated through an angle of 180° by said motor (28) so as to turn said cartridge (2) from said A-face to said B-face or the reverse, while said cartridge (1) is simultaneously being conveyed to said player (4) by said carrier (6) and while a cartridge (1) received from said player (4) and held on said overturn plate (18) is conveyed to said stocker (2) by said carrier (6).

2. A diskfile device according to claim 1 wherein sensors are provided so as to detect two positions of said overturn plate (18) after said rotation of said overturn plate through an angle of 180°.

3. A diskfile device comprising:
   a stationary stocker (2) for accommodating a plurality of cartridges (1) in parallel with one another in respective shelves (3) of said stationary stocker (2), each of said cartridges (2) including a disk having an A-face and a B-face;

a stationary player (4) for inserting information in and extracting information from a disk in a respective cartridge (1);

a carrier (6) for conveying a cartridge (1) selectively drawn from said stocker (2) and including means for feeding said cartridge (1) to said player (4) and receiving said cartridge from said player; and an overturn plate (18) pivotally secured to said carrier (6) within a U-shaped frame (17) of said carrier (6), wherein a pair of shafts (21 22) are disposed on one side (18a) of said overturn plate (18) and a cartridge holder (23) is disposed on the other side (18b) of said overturn plate (18), said pair of shafts (21) (22) being arranged over a central portion of said overturn plate (18) along the width direction of said overturn plate and spaced apart distance from each other in a direction of a central line (X'), which is parallel to a direction (X) to which said cartridge (1) is moved, said overturn plate (18) is arranged to be turned on said pair of shafts (21) (22) through an angle of 180°, a motor (28) is arranged between said pair of shafts (21) (22) in alignment therewith so as to rotatably drive one of said shafts (21), and said cartridge (1) is turned from A-face to B-face or the reverse due to turning of said overturn plate (18) through said angle of 180° by said motor (28), while a cartridge (1) drawn from said stocker (2) is held in said cartridge holder (23) in the overturn plate (18) and conveyed to said player (4) by said carrier (6), or while a cartridge (1) received from said player (4) is held in said cartridge holder (23) in the overturn plate (18) and conveyed to said stocker (2) by said carrier (6).

4. A diskfile device comprising:

a stationary stocker (2) for accommodating a plurality of cartridges (1) in parallel with one another in respective shelves (3) of said stationary stocker (2), each of said cartridges (2) including a disk;

a stationary player (4) for inserting information in and extracting information from a disk in a respective cartridge (1);

a carrier (6) for conveying a cartridge (1) selectively drawn from said stocker (20) so as to feed and receive said cartridge (1) to and from said player (4), respectively; and an overturn plate (18) pivotally secured to said carrier (6) within a U-shaped frame (17) of said carrier (6) for pivotal motion about a central line, wherein a pair of shafts (21) (22) are disposed on one side (18a) of said overturn plate (18) and a cartridge holder (23) is disposed on the other side (18b) of said overturn plate (18), said pair of shafts (21) (22) being arranged over the central portion of said overturn plate (18) along the width direction of said overturn plate and spaced apart a distance from each other in a direction along said central line (X'), which is parallel to a direction (X) to which said cartridge (1) is moved, said overturn plate (18) is mounted to be turned on said pair of shafts (21) (22) through an angle of 180°, a motor (28) is arranged between said pair of shafts (21) (22) in alignment therewith so as to drive one of said shafts (21), said cartridge (1) is turned from said A-face to B-face or the reverse due to turning of said overturn plate (18) through the angle of 180° by said motor (28) while a cartridge (1) drawn from said stocker (2) is held in said cartridge holder (23) in the overturn plate (18) and conveyed to said player (4) by said carrier (6), or while a cartridge (1) received from said player (4) is held in said cartridge holder (23) in the overturn plate (18) and conveyed to said stocker (2) by said carrier (6), two first sensors (37) (38) are secured to said frame (17) so as to detect two turned positions of said overturn plate (18), two second sensors (41) (42) are secured to respective positions on said frame (17) which correspond with two positions of said cartridge holder (23) due to turning of said overturn plate (18), said second sensors (41) (42) detect a plurality of detected portions (44) provided in positions in said shelves (3) of the stocker (2) and a cartridge inserting portion of said player (4), a turned position of said overturn plate (18) being detected by one of said first sensors (37) (38) when said overturn plate (18) is turned through the angle of 180° during conveying of said cartridge (1) by said carrier (6) as to bring a corresponding second sensor (41) or (42) into operation, and said corresponding sensor (41) or (42) detects an appointed detected portion (44), so that said carrier (6) is stopped so as to put said cartridge holder (23) in a position to insert a cartridge (1) held in said cartridge holder (23) into said player (4), or into an appointed shelf (3) of said stocker (2).

5. A diskfile device according to claim 4 wherein said first sensors (37) (38) and said second sensors (41) (41) are optical sensors each of which comprises a light emission element and a light reception element.

6. A diskfile device comprising:

a stationary stocker for accommodating a plurality of cartridges in parallel with one another in respective shelves of said stationary stocker, each of said cartridges including a disk and each having an A-face and a B-face;

a player for recording information on and reproducing information from a disk in a respective cartridge;

a carrier for conveying said cartridge selectively drawn from said stocker and including means for feeding said cartridge to said player and receiving said cartridge from said player, and including an overturn plate for holding a cartridge and being mounted so as to be rotatable through an angle of 180°; and driving means for rotating said overturn plate so as to turn said cartridge from said A-face to said B-face or the reverse simultaneously while said cartridge drawn from said stocker is being conveyed to said player by said carrier and while said cartridge received from said player is being conveyed to said stocker by said carrier.

7. A diskfile device according to claim 6, further comprising sensors provided so as to detect two positions of said overturn plate.

8. A diskfile device according to claim 6, wherein said carrier has a U-shaped frame and said overturn plate is pivotally supported in said U-shaped frame by a pair of shafts; said pair of shafts being arranged over a central portion of said overturn plate along the width direction thereof and being in mutual spaced-apart relationship in a direction of a central line of said overturn plate, which direction is parallel to a direction to which said cartridge is moved.

9. A diskfile device according to claim 8, wherein said U-shaped frame has mounted thereon a first sensor for detecting one of two turned positions of said overturn plate, a second sensor for detecting another of the two turned positions of said overturn plate, a third sensor being arranged in a position corresponding to said one of said two turned positions, and a fourth sensor being arranged in a position corresponding to said another of said two turned positions, said third and fourth sensors detecting a plurality of detecting portions provided in positions corresponding to said shelves of said stationary stocker and a cartridge inserting portion of said player, so that when said first sensor detects said one of said two turned positions of said overturn plate, said third sensor is brought into operation, and when said second sensor detects said another of two turned position of said overturn plate, said fourth sensor is brought into operation.

10. A diskfile device according to claim 9, wherein said first, second, third, and fourth sensors are optical sensors, each of which comprises a light emission element and a light reception element.

* * * * *